US009508190B2

(12) United States Patent
Zhang et al.

(10) Patent No.: US 9,508,190 B2
(45) Date of Patent: Nov. 29, 2016

(54) METHOD AND SYSTEM FOR COLOR CORRECTION USING THREE-DIMENSIONAL INFORMATION (75) Inventors: Dong-Qing Zhang, Burbank, CA (US); Ana Belen Benitez, Los Angeles, CA (US); James Arthur Fancher, Marina Del Rey, CA (US)

(73) Assignee: THOMSON LICENSING, Issy les-Moulineaux (FR)

( * ) Notice: Subject to any disclaimer, the term of this patent is extended or adjusted under 35 U.S.C. 154(b) by 227 days.

(21) Appl. No.: 12/308,137

(22) PCT Filed: Jun. 9, 2006

(86) PCT No.: PCT/US2006/022580
§ 371 (c)(1),
(2), (4) Date: Dec. 8, 2008

(87) PCT Pub. No.: WO2007/142649
PCT Pub. Date: Dec. 13, 2007

(65) Prior Publication Data
US 2009/0303247 A1 Dec. 10, 2009

(51) Int. Cl.
*G06T 15/50* (2011.01)
*G06T 15/20* (2011.01)

(52) U.S. Cl.
CPC ............. *G06T 15/50* (2013.01); *G06T 15/20* (2013.01); *G06T 15/506* (2013.01)

(58) Field of Classification Search
CPC .. G09G 5/02; G09G 5/06; G09G 2320/0666; G06F 3/04845; G06T 11/001
See application file for complete search history.

(56) References Cited

U.S. PATENT DOCUMENTS 6,014,343 A * 1/2000 Graf et al. .................. 367/38
6,320,578 B1 11/2001 Shiitani et al.
(Continued)

FOREIGN PATENT DOCUMENTS

JP 9081737 3/1997
JP 9-107485 4/1997
(Continued)

OTHER PUBLICATIONS

Powell et al.:"A Methodology for Extracting Objective Color From Images", IEEE Transactions on Systems, Man and Cybernetics. Part B: Cybernetics, IEEE Service center, Piscataway, NJ, USA, vol. 34, No. 5, Oct. 2004, pp. 1964-1978, XP011118826.
(Continued)

*Primary Examiner* — Michelle Chin
(74) *Attorney, Agent, or Firm* — Brian J. Dorini; Lily Neff (57) ABSTRACT A system and method for the color correction of an image using three-dimensional, geometrical information of the capture environment of the image includes determining geometrical properties of at least a portion of the image and modifying a look of at least the portion of the image by altering a value of at least one of the determined geometrical properties and using image formation theory. In one embodiment of the present invention, the geometrical properties of the image include at least one of light properties, surface color, reflectance properties, and scene geometry of the at least one portion of the image. In accordance with the present invention, the geometrical properties of the image are alternatively determined by using sensing devices, by inferring the geometrical properties from the image itself, or by user input.

17 Claims, 6 Drawing Sheets (56) References Cited

U.S. PATENT DOCUMENTS

| | | | |
|---|---|---|---|
| 6,707,938 | B2 | 3/2004 | De Queiroz et al. |
| 6,983,064 | B2 | 1/2006 | Song |
| 2003/0128273 | A1 | 7/2003 | Matsui et al. |
| 2004/0070565 | A1 | 4/2004 | Nayar et al. |
| 2004/0258297 | A1 | 12/2004 | Yeh et al. |
| 2005/0069201 | A1 | 3/2005 | Speigle et al. |
| 2005/0128452 | A1* | 6/2005 | Matsumoto ............... 355/55 |
| 2005/0158044 | A1 | 7/2005 | Ide et al. |
| 2007/0132759 | A1 | 6/2007 | Mallick et al. |
| 2009/0010507 | A1* | 1/2009 | Geng ........................ 382/128 |

FOREIGN PATENT DOCUMENTS

| | | |
|---|---|---|
| JP | 11345319 | 12/1999 |
| JP | 2000184396 | 6/2000 |
| JP | 2002345000 | 11/2002 |
| JP | 2005208300 | 8/2005 |
| JP | 2005229280 | 8/2005 |
| JP | 2005275790 | 10/2005 |
| WO | WO 2005034527 | 4/2005 |
| WO | WO 2007142649 | 12/2007 |
| WO | WO 2008/063167 A1 | 5/2008 |

OTHER PUBLICATIONS

Loscos et al.:"Interactive Virtual Relighting of Real Scenes", IEEE Transactions on Visualization and Computer Graphics, IEEE Service Center, Los Alamitos, CA, USA, vol. 6, No. 4, Oct. 2000, pp. 289-305, XP000976847.

Marschner et al.:"Inverse Lighting for Photography", Fifth Color Imaging Conference: Color Science, Systems and Applications, Nov. 1997, pp. 262-265, XP002449913.

Patow et al.:"A Survey of Inverse Rendering Problems", Computer Graphics Forum, vol. 22, No. 4, 2003, pp. 663-687, XP009089151.

Debevec et al.:"Modeling and Rendering Architecture from Photographs: A Hybrid Geometry-and ImageBased Approach", Computer Graphics Proceedings 1996, New Orleans, Aug 4, 1996, pp. 11-20, XP000682717.

International Search Report, dated Sep. 25, 2007.

Theobalt CH et al.: "Joint Motion and Reflectance Capture for Creating Relightable 3D Videos" Research Report MPI—I 2005-4-004, Apr. 2005, pp. 1-17.

Office Action for U.S. Appl. No. 12/311,839 mailed Jul. 3, 2012.

Notice of Allowance for U.S. Appl. No. 12/311,839 mailed Apr. 24, 2013.

* cited by examiner

METHOD AND SYSTEM FOR COLOR CORRECTION USING THREE-DIMENSIONAL INFORMATION

This application claims the benefit, under 35 U.S.C. §365 of International Application PCT/US2006/022580, filed Jun. 9, 2006, which was published in accordance with the PCT Article 21(2) on Dec. 13, 2007 in English.

FIELD OF THE INVENTION

The present invention generally relates to color correction systems and methods and, more particularly, to color correction using geometrical information to provide additional flexibility and functionality in color correction processes.

BACKGROUND OF THE INVENTION

Color correction is a process used in many color applications. In a particularly useful application, color correction is employed in film post-production workflow. One purpose for color correction is to alter the color, brightness, contrast, color temperature, etc. of an image or part of the image so as to change the "look" of an image. Traditional color correction is purely a two-dimensional (2D) technique which does not allow users to take into account or modify the conditions involved in the image formation process, such as light source position, surface material and surface geometry, to name a few.

Color correction is an important process implemented in a film post-production workflow. Color correction processes are conducted by colorists with the aid of software systems, such as, for example, Da Vinci™ (now owned by JDS Uniphase™ Inc.), Lustre™ (now owned by Discreet, Autodesk™ Inc.), and others. The color correction functionality implemented by these systems includes region selection, color grading, defocus, key channel and matting, Gamma control, brightness, contrast, etc. Some special effects such as shadowing and shading of surfaces may be realized using such software packages by using solely two-dimensional (2D) procedures (for example, using matte and key channel). However, currently no three-dimensional (3D) information and image formation theory has been employed by such software packages for facilitating color correction.

Compositing is a related technique which is also an important process in film post-production. Compositing combines images from multiple sources, including computer generated elements. A typical example of compositing is the blue-screen technique in which a blue key color in a movie frame is replaced by a background plane to achieve special visual effects. The traditional blue-screen technique is a 2D procedure in the sense that the 3D geometry and lighting conditions of the scene are not taken into account. Consequently, the lighting environment of foreground and background planes may not be compatible in a final composite image frame. As such, an additional color correction process has to be performed after the compositing process using software, for example, to correct for the incompatible lighting conditions.

Although color correction is extensively used in various applications, such as film post-production, the current color correction processes and software applications do not enable users to manipulate and/or account for 3D properties of an image capture process such as the three-dimensional geometry of a scene, light source conditions and positions and surface reflectance properties. As such, applications in which such factors have to be considered are limited and require additional post-processing.

SUMMARY OF THE INVENTION

The present invention addresses the deficiencies of the prior art by advantageously providing a method and system for the color correction of an image using three-dimensional, geometrical information of the capture environment of the image.

In one embodiment of the present invention, a method for color correction of an image includes determining geometrical properties of at least a portion of the image and modifying a look of at least the portion of the image by altering a value of at least one of the determined geometrical properties and using image formation theory. In one embodiment of the present invention the geometrical properties include at least one of light properties, surface color, reflectance properties, and scene geometry of the at least one portion of said image. In addition, the geometrical properties can alternatively be determined by using sensing devices, by inferring the geometrical properties from the image itself, or by user input.

In an alternate embodiment of the present invention, a system for color correction of an image includes a display device configured to display images, and a color correction device. In one embodiment of the present invention, the color correction device is configured to determine image capture geometrical properties of at least a portion of the image and to modify a look of at least the portion of the image by altering a value of at least one of the determined geometrical properties. That is, one embodiment of a system for color correction of an image using image geometry includes determining three-dimensional information about geometry, light and surface reflectance properties of a portion of an image. The look of the portion of the image is modified for light properties, surface color reflectance properties and/or scene geometry, by employing the three-dimensional information and image formation theory.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for color correcting images using three-dimensional information of the image capture environment. Although the present invention will be described primarily within the context of a post-processing environment, the specific embodiments of the present invention should not be treated as limiting the scope of the invention. It will be appreciated by those skilled in the art and informed by the teachings of the present invention that the concepts of the present invention can be advantageously applied in any environment for the color correction and/or color adjustment of captured images or portions of images.

The present invention provides systems and methods for color correction that use geometry information to modify one or more attributes such as the geometry, lighting and surface reflectance properties of a scene depicted in a received image for adjusting the appearance (e.g., color or "look") of an image. For example, in one embodiment, the color correction of the present invention is implemented in video or film processing. Scene three-dimensional (3D) information of the scene is used to change the lighting (either inferred from an image or explicitly provided), surface reflectance properties, and surface geometry. The 3D color correction system in accordance with present principles uses images together with imaging elements such as light sources and surface reflectance properties to enable users (e.g., colorists) to alter the appearance (e.g., color or "look") of an image by modifying the properties of light sources, surface reflectance, and other geometrical information. In one embodiment, the color correction process is performed in conjunction with a traditional color correction process to determine a final desired "look". In accordance with the present invention, specific objects can be segmented and modified separately in accordance with the modification principles of the present invention.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Figure 1:
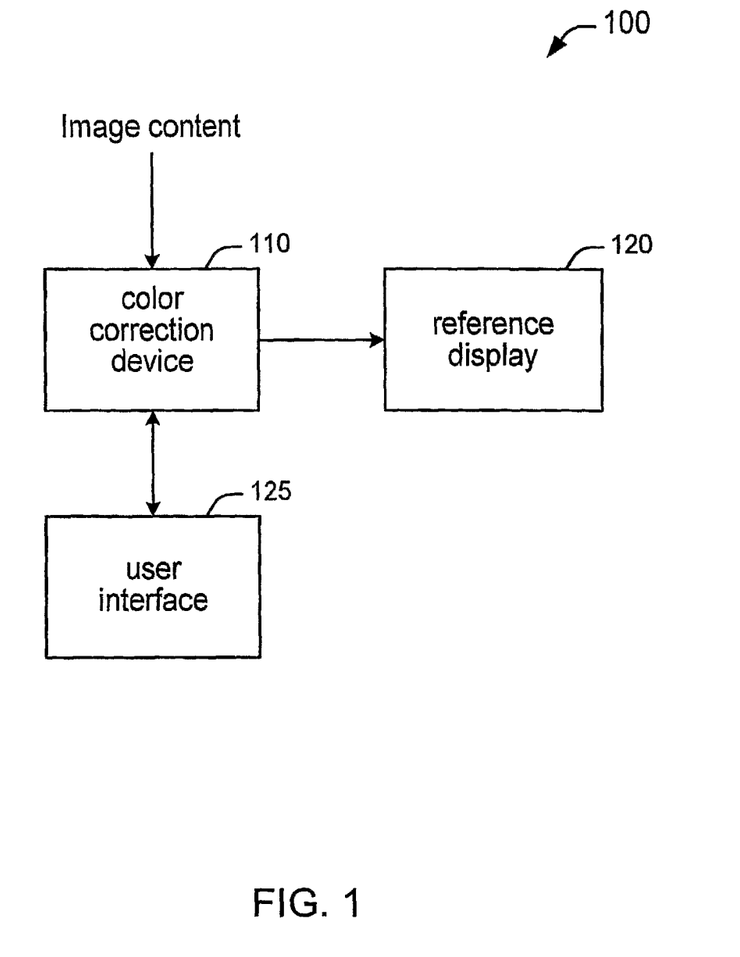
FIG. 1 depicts a high level block diagram of a color correction system incorporating three-dimensional geometric information into a color correction process in accordance with an embodiment of the present invention.

For example, FIG. 1 depicts a high level block diagram of a color correction system incorporating three-dimensional geometric information into a color correction process in accordance with an embodiment of the present invention. The color correction system 100 of FIG. 1 illustratively comprises a color correction device 110 and a reference display 120. In the color correction system 100 of FIG. 1, image content is received by the color correction device 110. In the color correction device 110, information regarding the environment in which the image was captured (i.e., lighting conditions of a room in which the image was captured by a camera) is used by the color correction device 110 to perform color adjustments on the received images. The image correction can be displayed in real time on the reference display 120 to assist in the color correction. The color correction system 100 of FIG. 1, in accordance with the present invention, provides a color correction process that, in one embodiment, incorporates the theory of image formation in 3D environments that takes into account at least some if not all of the environmental conditions involved in image capture, including camera position, light source position and intensity, surface material and scene geometry.

Figure 2:
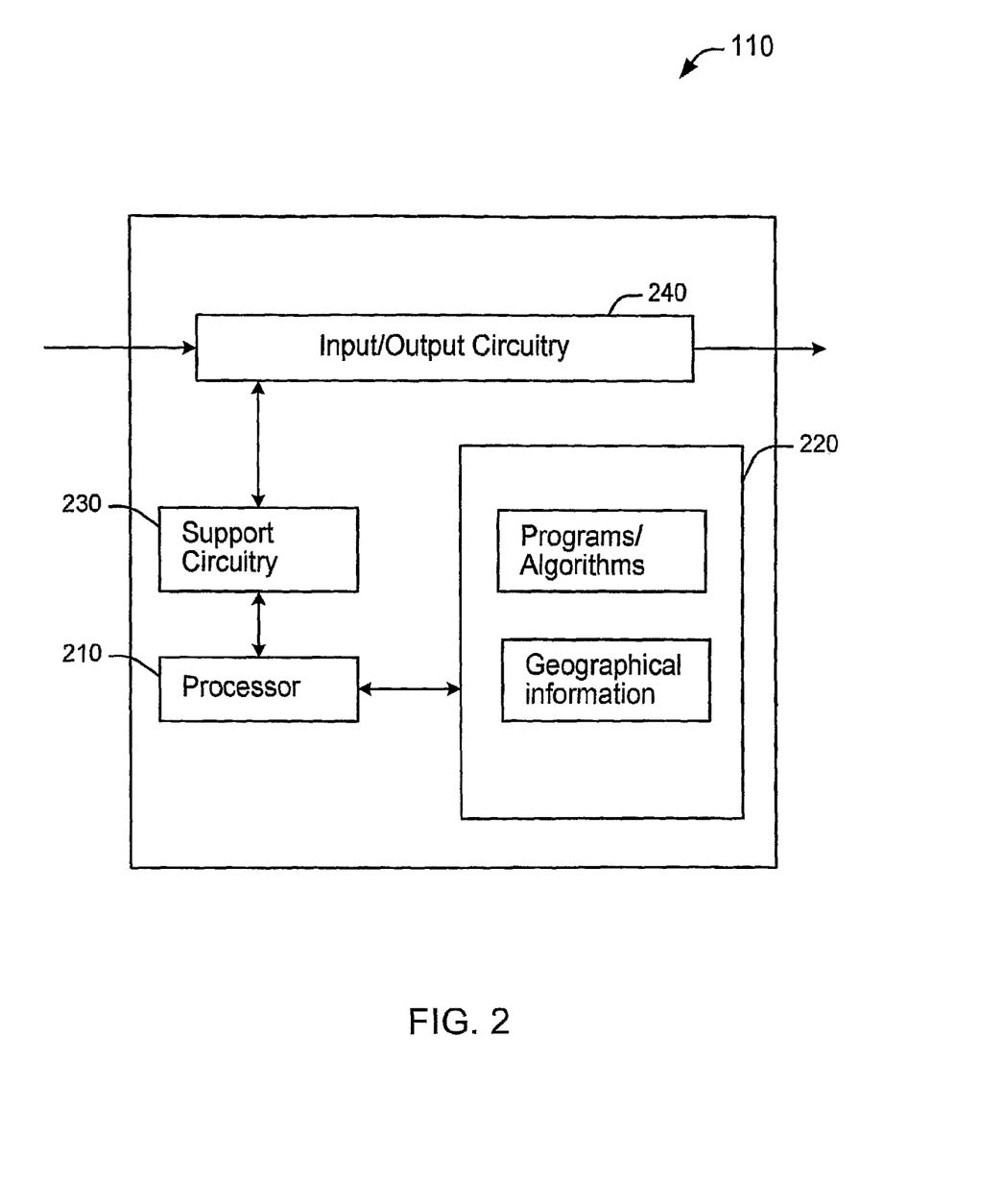
FIG. 2 depicts a high level block diagram of an embodiment of a color correction device suitable for use in the color correction system of FIG. 1 in accordance with the present invention.

FIG. 2 depicts a high level block diagram of an embodiment of a color correction device suitable for use in the color correction system 100 of FIG. 1 in accordance with the present invention. The color correction device 110 of FIG. 2 comprises a processor 210 as well as a memory 220 for storing control programs, algorithms, geographical information and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The color correction device 110 also contains input-output circuitry 240 that forms an interface between the various respective functional elements communicating with the color correction device 110.

Although the color correction device 110 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In one embodiment of the present invention, the color correction system 100 of the present invention can further comprise a user interface 125 for enabling a user to input into the color correction device 110 information regarding environmental conditions involved in image capture. The user interface 125 of the color correction device 110 of FIG. 1 can comprise wireless remote controls, pointing devices, such as a mouse or a trackball, voice recognition systems, touch screens, on screen menus, buttons, knobs and the like. In addition, the user interface 125 can be provided directly on the color correction device 110 or on a remote panel or device.

Figure 3:
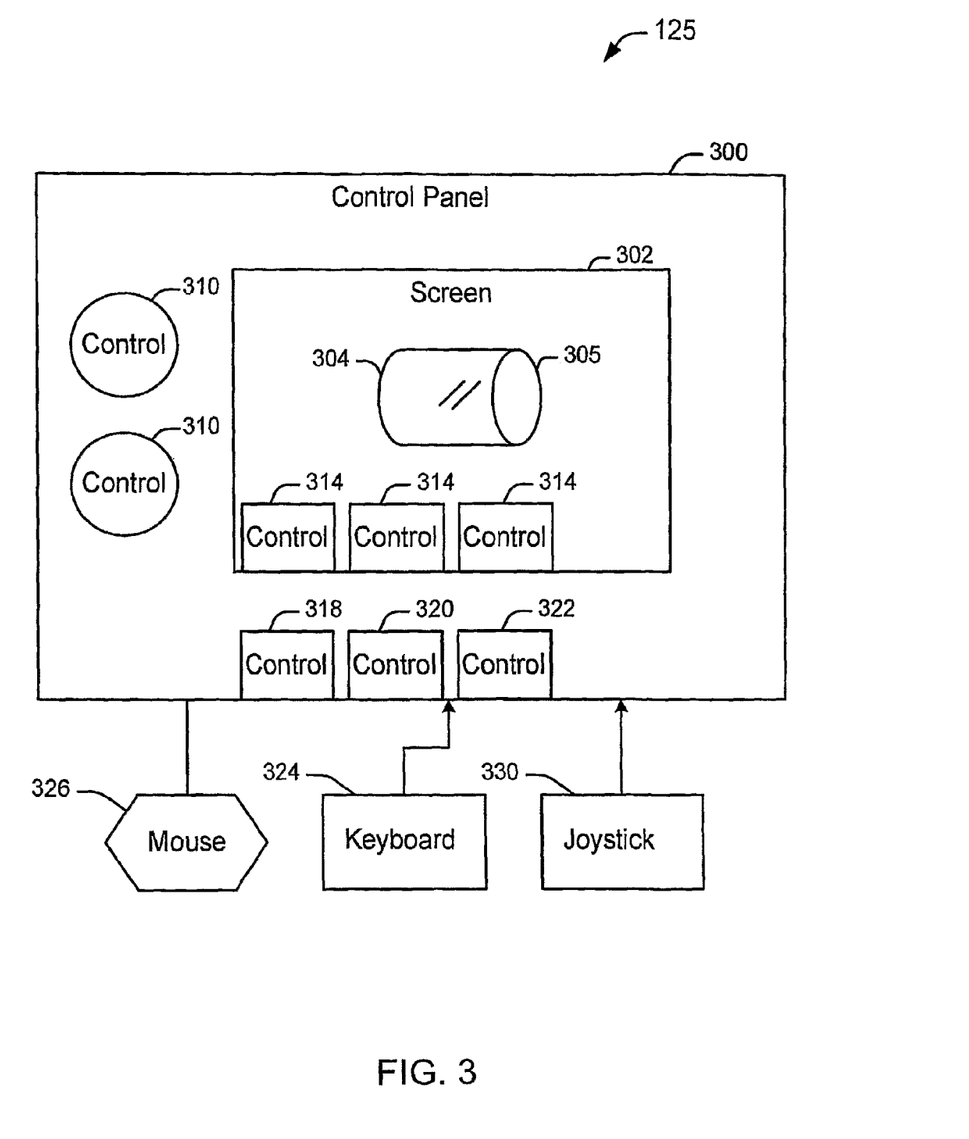
FIG. 3 depicts a high level block diagram of a user interface 125 suitable for use in the color correction system 100 of FIG. 1 in accordance with an embodiment of the present invention.

For example, FIG. 3 depicts a high level block diagram of a user interface 125 suitable for use in the color correction system 100 of FIG. 1 in accordance with an embodiment of the present invention. As described above, the user interface 125 is provided for implementing color correction with three-dimensional geometric information in accordance with an embodiment of the present invention. The user interface 125 of FIG. 3 can be a stand alone workstation including a screen or display 302 or can be implemented in software as a graphical user interface on a computer. Controls 310-326 can include actual knobs/sticks (310), keypads/keyboards (324) buttons (318-322) virtual knobs/sticks and/or buttons (314), a mouse (326), etc. depending on the implementation of the user interface 125.

Screen 302 illustratively includes a region for viewing images or image components to permit color correction and geometric or light source modification in the images. A user controlled cursor (not shown) can be employed on screen to activate controls and to highlight or make active portions of the screen 302. A cursor can be employed and moved using a mouse 326, a keypad 324, joystick or other selection/pointing device 330, which can be maintained as part of or separate from the user interface.

In one example, a region 304 of an image is selected for processing. The region can include an object 305 for which geometric data, light source data, reflectance data and any other characteristic may have been collected and stored. The object 305 is preferably selected to include a constant property (e.g., reflectance) and can be used as a way of determining or inferring a light source position, geometric characteristics or both. A rendering of the image can be displayed on the screen 302. Modifications can be made to the image based on the set of properties gathered during the filming of the image or attributed to the objects of the images by inference. The editing tools and refinements described herein can be performed automatically using software based tools, manual manipulation or a combination of both.

In an alternate embodiment of the present invention, the color correction device of the present system is configured to be located in the region of image capture and can comprise various sensors (not shown) for determining environmental conditions involved in image capture. For example, a color correction device of the present invention can comprise light sensors for determining the lighting conditions of an environment in which an image was captured. Alternatively, some environmental conditions of image capture can be inferred from a captured image.

Figure 4:
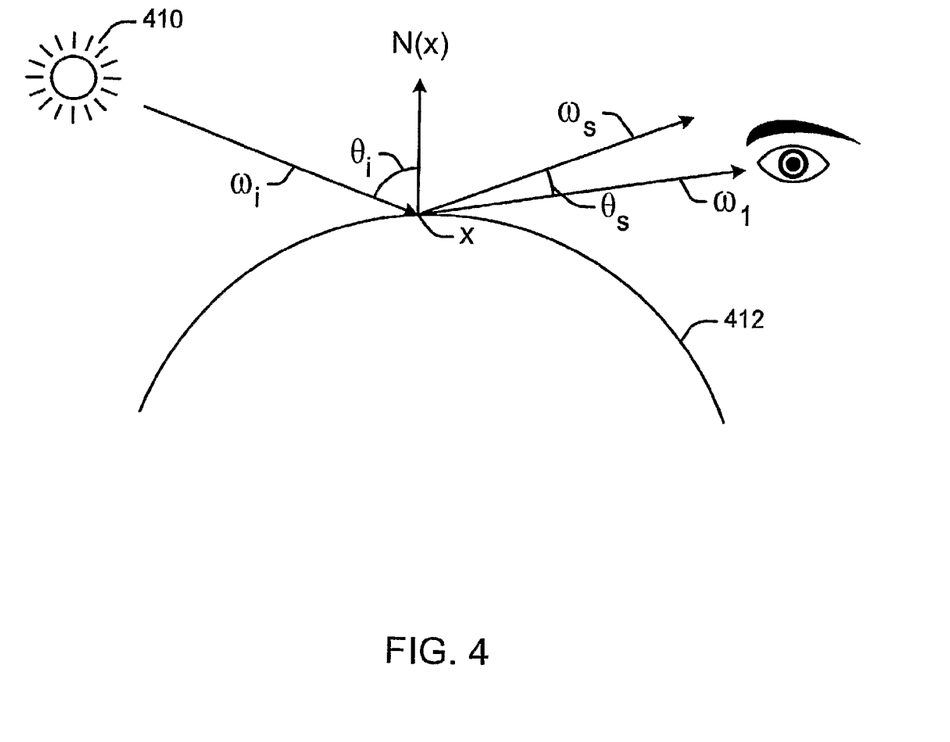
FIG. 4 depicts a diagram illustrating the principles of surface rendering in accordance with an embodiment of the present invention.

In various embodiments of the present invention, the inventors implement an image formation theory for determining aspects of a captured image. For example, the formation of an image depends on at least the following four factors: camera, scene geometry, light source and surface reflectance properties. The relationship between the reflected radiance (which is proportional to the final observed pixel value after camera projection) and the above four factors can be approximated according to equation one (1), which follows:

$$L_r(x, \omega_r, \lambda) = L_e(x, \omega_r, \lambda) + \int_{\Omega_i} L_i(x, \omega_i, \lambda) f(x, \omega_i, \omega_r, \lambda) \cos\theta_i d\omega_i, \quad (1)$$

where $L_r(x,\omega_r,\lambda)$ depicts the reflected radiance, which is proportional to the observed pixel value after camera projection; x depicts a point on the scene surface; $\omega_r$ depicts the reflection angle; $\lambda$ depicts the wavelength; $L_i(x,\omega_i,\lambda)$ depicts the incident radiance; $\omega_i$ depicts the incident angle; $f(x,\omega_i,\omega_r,\lambda)$ depicts the Bi-directional Reflection Distribution Function (BRDF), which characterizes the surface material properties; $L_e(x,\omega_r,\lambda)$ depicts the emission radiance resulted from the surface; and $\cos\theta_i=(\omega_i \cdot n)$, n depicts the surface normal. The BRDF $f(x,\omega_i,\omega_r,\lambda)$ can be decomposed into diffusive (Lambertian) and specular components. Using the Phong model for specular reflectance, the above equation can be written according to equation two (2), which follows:

$$L_r(x, \omega_r, \lambda) = L_e(x, \omega_r, \lambda) + \quad (2)$$
$$\rho_d(x, \lambda) \int_{\Omega_i} L_i(x, \omega_i, \lambda)\cos\theta_i d\omega_i + \rho_s(x, \lambda) L_s(x, \omega_s, \lambda)(\cos\theta_s)^n$$

where $\omega_s$ depicts the angle of the specular direction, which is determined by the surface normal and incident ray; $L_s$ depicts the radiance along the specular direction; $\rho_d$ and $\rho_s$, are the diffusive and specular Albedo (reflection rate) respectively; and $\cos\theta_i=(\omega_s \cdot \omega_r)$, and n depicts a parameter that determines the sharpness of the specularity. The relationship between these elements is illustratively depicted in FIG. 4.

More specifically, FIG. 4 depicts a diagram of the basic principles for surface rendering. In FIG. 4, a source of light 410 provides light at incident angle $\omega_i$, which forms an angle $\theta_i$ with a normal N(x). Normal N(x) is normal to a surface 412 which is responsible for reflecting the light from source 410. In the diagram of FIG. 4, $\omega_r$ depicts the angle of reflectance, $\omega_s$ depicts the angle of the specular direction and $\theta_s$ depicts the angle between them.

In many cases, a scene surface 412 can be approximated as a Lambertian surface, where the reflectance property (BRDF) is constant along every direction, which also indicates that the specular term in equation (2), above, vanishes. If the surface emission can be also ignored (which is true for most surface types), equation (2) can be simplified and characterized according to equation three (3), which follows:

$$L_r(x, \omega_r, \lambda) = \rho_d(x, \lambda) \int_{\Omega_i} L_i(x, \omega_i, \lambda)\cos\theta_i d\omega_i \quad (3)$$
$$= \rho_d(x, \lambda) I_d(x, \lambda),$$

where $$I_d(x, \lambda) = \int_{\Omega_i} L_i(x, \omega_i, \lambda)\cos\theta_i d\omega_i$$

depicts illumination image, which encodes the interaction of light and surface geometry while excluding the influence of the scene Albedo. The Albedo map can be recovered from an observed image and the illumination image according to equation four (4), which follows:

$$\rho_d(x, \lambda) = \frac{L_i(x, \omega_i, \lambda)}{I_d(x, \lambda)} \quad (4)$$

From the discussion above, to realize color correction capabilities in 3D environments, information of light sources and surface geometry as well as surface reflectance properties can be needed before processing. There are several ways to obtain the 3D information from images including for example, from external sources or inferred from an image being processed. For the external sources, 3D geometry can be acquired by geometry capturing devices such as, for example, laser scanners or other devices. Light information can be determined from light sensors and/or lighting capture devices such as mirror balls. For inferring environmental properties from an image, attempting to recover scene geometry, light and surface reflectance properties simultaneously from a single image is difficult, as multiple unknown variables exist. However, in the color correction process, users can interact with the system to achieve the desired effects.

The user-computer interaction therefore can be exploited for facilitating and enhancing scene geometry reconstruction. For example, a user can select a "good" region for the system to infer the light sources. Then, the inferred light sources can be used for more complicated regions. Users can also attempt to estimate the positions of the light sources and assist in the definition of the light sources and the 3D geometry of the scene.

Figure 5:
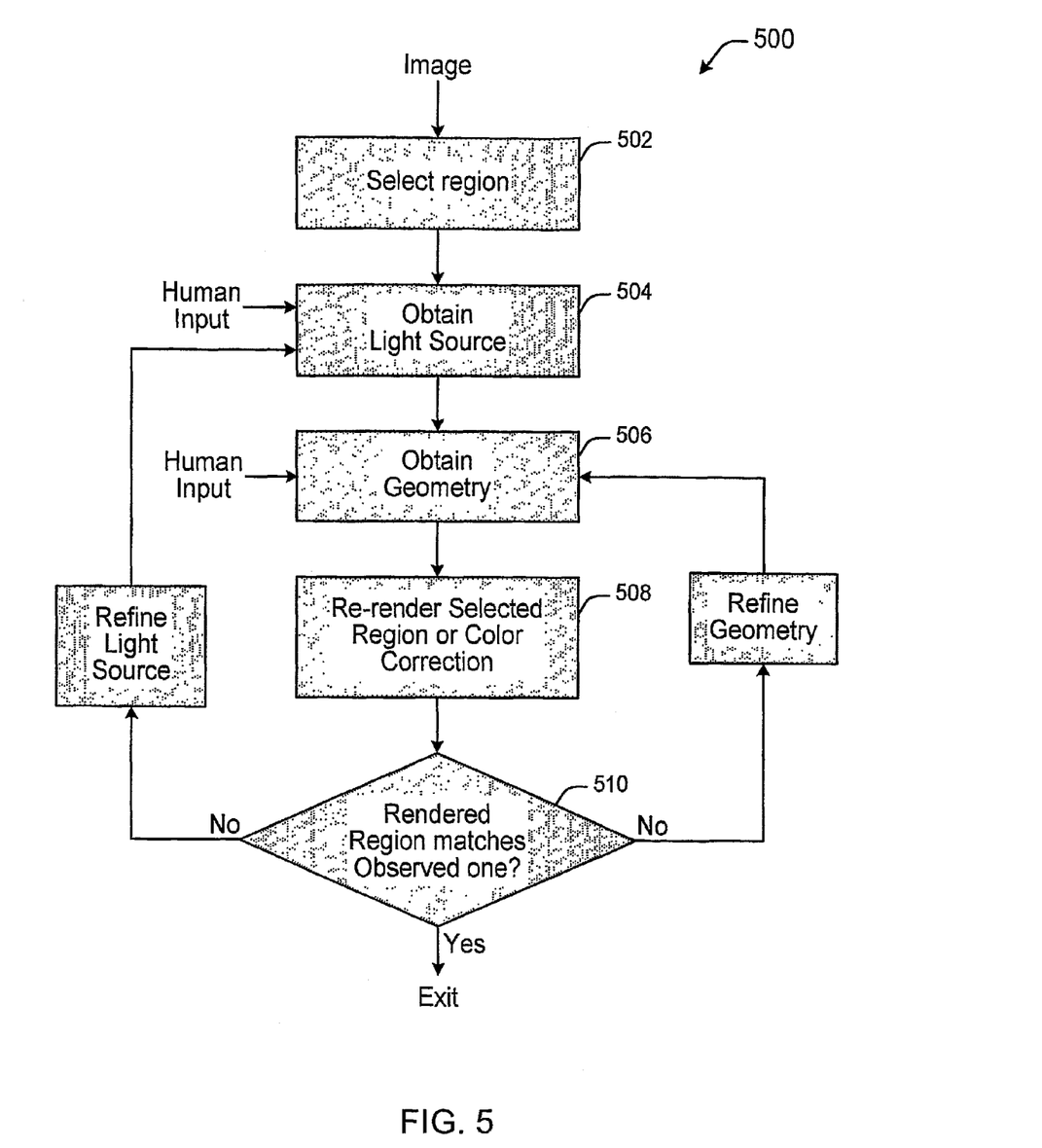
FIG. 5 depicts a flow diagram of a method for determining three-dimensional information of a scene in accordance with an embodiment of the present invention.

For example, FIG. 5 depicts a flow diagram of a method for determining three-dimensional information of a scene in accordance with an embodiment of the present invention. The method of FIG. 5 begins at step 502 in which a user selects a region of a received image with certain properties (for example, Lambertian surfaces). The method then proceeds to step 504.

At step 504, a user provides an estimation of the light positions in a scene in accordance with the image content. The method then proceeds to step 506.

At step 506, available geometry of the selected region is estimated (described in further detail below) by, for example the color correction device 110 of FIG. 1, based on known light sources estimate in step 504. The method then proceeds to step 508.

At step 508, the selected region is re-rendered (described in more detail below). The method then proceeds to step 510.

At step 510, the appearance of the original selected region and the re-rendered region are compared. If the re-rendered region and the original region do not match well, the method returns to step 504 in an attempt to achieve a better match. If the re-rendered region and the original region do match well, the method is exited. A match can be based on objective criteria or image specifications that can be used to determine if the image has improved. In accordance with the present invention, once the three-dimensional information of a scene is determined as described above, the three-dimensional properties (e.g., light source position and intensity, surface reflectance, etc.) can be modified (described in further detail below) to achieve a desired "look" for an image.

Although in the method of FIG. 5, only the estimation of the light source information (e.g., location and/or intensity) is described, in alternate embodiments of the present invention, other geometrical information can be estimated such as surface geometry, etc. The rendered information (e.g., light information) 120 can then be re-used as a starting point for other regions in the same image.

A process for determining scene geometry from estimated light source information will now be described in further detail. Assuming the selected region is a Lambertian surface patch having constant Albedo or other constant properties, the Albedo map can be piece-wise constant and, therefore, the Albedo map should not be difficult for an experienced or trained user to determine a region with constant Albedo. Note that for Lambertian surfaces, the light, geometry and Albedo are constrained by equation (3) described above. If the Albedo is constant in the selected color correction region, information regarding either the light information or geometry information can be used to recover the other unknown factor.

Given the Albedo map (constant in the region) and the light position (finite number of point light sources), the geometry of an image can be recovered by first obtaining the surface normal N(x), which can be obtained using equation five (5), which follows:

$$L_r(x, \omega_r, \lambda) = \rho_d(x) \sum_i (N(x) \cdot \omega_i(x)) L_i \quad (5)$$

where $L_i$, depicts the radiance of the point light source i; N(x) depicts the surface normal; and $\omega_i$ depicts the incidence light ray of the light source i. However, solving equation (5) is difficult because equation (5) can have an infinite number of solutions. To make solving the equation more well-defined, the inventors propose imposing a constraint that the normal map is continuous and smooth within the region. Therefore, a well-defined function can be characterized according to equation six (6), which follows:

$$F(N(x)) = \int \left| \rho_d(x) \sum_i \left( \frac{N(x) \cdot}{\omega_i(x)} \right) L_i \right|^2 dx + \lambda \int |\nabla_x N(x)|^2 dx \quad (6)$$

In equation (6), the first term (the first integral) of the function satisfies equation (5), while the second term (the second integral) is a regularization term for imposing the smooth constraint. By minimizing the function of equation (6), the approximated normal map N(x) can be characterized according to equation seven (7), which follows:

$$\hat{N}(x) = \underset{N(\cdot)}{\operatorname{argmax}} F(N(x)) \quad (7)$$

Functions similar to the function of equation (6) have been used to determine conditions in other industries, such as optical flow estimation. The solution in general can be found by gradient decent, or converting the function minimization to solve an Euler-Lagrange differential equation, which is then solved by known numerical methods. Once the normal map is recovered, the geometry in the region can be recovered by solving a second order differential equation with the region boundary as the initial condition. The approach to computing a 3D surface from the normal map can be found in standard computer vision textbooks.

Color correction with image formation theory and 3D information using image formation in accordance with the present invention will now be described. The present invention enables users (e.g., colorists) to change the "look" of an image by modifying at least the light color, the surface color and reflectance property, the light position, and the surface geometry. In addition, other changes can be employed. For example, any combination of these factors can be modified to create a desired "look". Such changes are preferably implemented in steps 504 and 508 of the method of FIG. 5 as described above.

For example, suppose it is desired to only modify the color of the incident light. As such, the color of the light needs to be scaled. Specifically, multiplying the incident light radiance by a factor $S(\lambda)$ changes the composition of the color component of the incident light. This can be used to change the color temperature, brightness, etc. Then, the reflected light of the scene is characterized according to equation eight (8), which follows:

$$L_r(x, \omega_r, \lambda) = \int_{\Omega_i} (S(\lambda) L_i(x, \omega_i, \lambda)) f(x, \omega_i, \omega_r, \lambda) \cos\theta_i d\omega_i \quad (8)$$

$$= S(\lambda) \int_{\Omega_i} L_i(x, \omega_i, \lambda) f(x, \omega_i, \omega_r, \lambda) \cos\theta_i d\omega_i$$

Equation (8) illustrates that scaling the light color is equivalent to scaling the final observed color. Therefore, modifying light color may be considered equivalent to the traditional color correction process.

Considering the simplest case of modifying a surface reflectance where the scene surface is assumed to be Lambertian and the material emission is ignored, the surface reflectance can be characterized according to equation nine (9), which follows:

$$L_r(x, \omega_r, \lambda) = \rho_d(x, \lambda) \int_{\Omega_i} L_i(x, \omega_i, \lambda) \cos\theta_i d\omega_i \qquad (9)$$

As with the modifications described above, scaling the diffusive Albedo $\rho_d(x,\lambda)$ with $S(\lambda)$ is equivalent to scaling the final observed value.

For cases in which both emission and specular property are not negligible, the 3D geometry and light information are needed for rendering. By using the process described for 3D geometry and light source information from an external source (i.e., from a lighting capture device and/or a 3D scanner), a user can change the emission component $L_e(x, \omega_r, \lambda)$, change the diffusive Albedo $\rho_d(x,\lambda)$, the specular Albedo $\rho_s(x,\lambda)$ and the specular power n. The selected region can then be re-rendered with equation (2) described above. Such re-rendering can be realized using existing ray-tracing algorithms.

In a case for modifying a light position and direction only, a user can change the position and the direction of the light if the light is directional. The user can also add additional light sources to the scene. If the 3D geometry of the surface is available, re-rendering can be simply achieved using equation (2) described above. By modifying the light positions, some special effects can be achieved, for example, changing the specularity of the surface.

In a case for modifying the scene geometry only, a user can change the geometry of the selected region. Changing the geometry of a surface can be realized by B-Spline-like editing tools, which are implemented in some existing software packages. Once the geometry is modified, equation (2) can be used to re-render the selected surface using ray-tracing algorithms.

In addition to the single-factor correction methods described above, the above described methods can be combined to change different aspects of objects looks of an image in accordance with the present invention. For example, in a case for modifying both the geometry (e.g., surface reflectance) and the light of an image, as described in the image formation theory, the scene rendering can be described according to equation ten (10), which follows:

$$L_r(x, \omega_r, \lambda) = L_e(x, \omega_r, \lambda) + \rho_d(x, \lambda) \int_{\Omega_i} L_i(x, \omega_i, \lambda) \cos\theta_i d\omega_i + \qquad (10)$$
$$\rho_s(x, \lambda) L_s(x, \omega_s, \lambda)(\cos\theta_s)^n$$
$$= L_e(x, \omega_r, \lambda) + \rho_d(x, \lambda) I_d(x, \lambda) + \rho_d(x, \lambda) I_s(x, \lambda)$$

where $I_d(x,\lambda)$ depicts the illumination image, and similar to $I_d(x,\lambda)$, the specular illumination image can be characterized according to equation eleven (11), which follows:

$$I_s(x,\lambda) = \rho_s(x,\lambda) L_s(x,\omega_s,\lambda)(\cos\theta_s)^n \qquad (11)$$

Both the illumination image and specular illumination image encode the light and geometry information of the 3D environment. By using illumination images, the light and geometry acquisition process can be avoided by only editing illumination images themselves instead of estimating geometry and light information. The illumination image and specular illumination images can be obtained by matte painting or can be rendered through a separate rendering process using the available 3D geometry. Once this is complete, equation (10) can be used to incorporate illumination images into the selected region.

Figure 6:
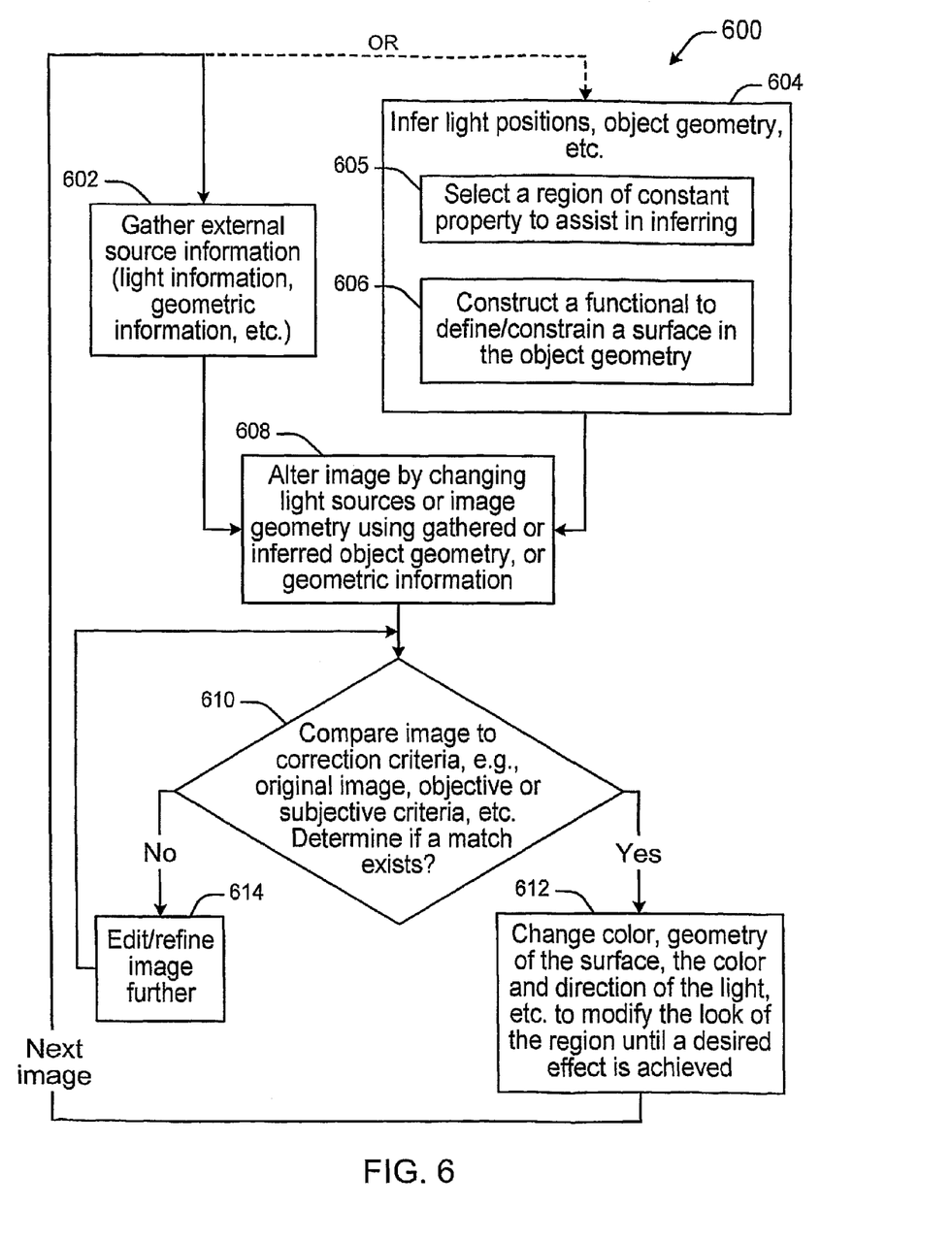
FIG. 6 depicts a flow diagram of a method for color correcting an image, using three-dimensional information of a scene in accordance with an embodiment of the present invention.

FIG. 6 depicts a flow diagram of a method for color correcting an image using three-dimensional information of a scene in accordance with an embodiment of the present invention. The method of FIG. 5 begins in step 602 in which information about characteristics of an object in a scene to be rendered in a received image are provided for color correction by gathering external source information regarding at least one of reflectance, light source information and geometry information for the object in the scene. As described above, such information can be gathered using external sensors. The method then proceeds to step 608.

Alternatively, in step 604, light source position and/or object geometry can be inferred from the received image. For example, as depicted in FIG. 6, inference of light source position and/or object geometry can include step 605 in which a region having a constant property or properties (e.g., Albedo, reflectance, etc.) is selected such that a light source position and/or the object geometry in the region is more easily determinable, and step 606, in which a function (e.g., equation (6)) is determined to define/constrain a surface for the object geometry. The method then proceeds to step 608.

At step 608, using at least one of the object geometry and the geometry information, the values in a selected region are computed for geometry and light estimation by changing the light source and/or changing the geometry of the portion. The method then proceeds to step 610.

At step 610, the estimated values in the region are compared to those in the original image to determine if a match exists. If a match exists, the method proceeds to step 612. If the match does not exist, the method skips to step 614.

At step 612, the color, geometry of the surface, the color and direction of light etc. are modified until a desired "look" is achieved.

At step 614, further editing or refinement is performed by refining the portion of the image by refining the values of the light source and/or refining the values of the geometry of the portion of the image to achieve a closer match. The light sources and geometry may be refined using an illumination image and a specular image encoded with light and geometry information for a three dimensional environment.

The method of the present invention can be repeated for other images or different regions of the same image. Referring back to step 612, the color, geometry of the surface and the color, direction of the light are altered until a desired "look" has been achieved. Desired "looks" can include correcting a particular color, fixing a geometric fault, or otherwise achieving a desired visual effect in accordance with objective or subjective standards.

Having described preferred embodiments for system and method for color correction of an image using three-dimensional, geometrical information of the capture environment of the image (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for color correction of an image, comprising:
selecting a portion of the image to be modified, wherein the selected portion includes a normal map that is continuous and smooth within the regions such that $$F(N(x)) = \int \left| L_r(x, \omega_r) - \rho_d(x) \sum_i (N(x) \cdot \omega_i(x)) L_i \right|^2 dx + \lambda \int |\nabla_x N(x)|^2 dx$$

and determining at least one geometrical property of the selected portion of the image to be modified by:
(a) estimating a value for at least one of said at least one geometrical property; wherein said estimated value is computed by changing the light source or geometry of said selected portion;
(b) rendering said portion of said image using said estimated value; and
(c) comparing said rendered portion of said image to a corresponding portion of said original image to determine if a match exists therebetween; and
(d) modifying an appearance of said portion of said image by altering a value of the at least one determined geometrical property when a match exists; and
(e) when a match does not exist, re-estimating the value of the at least one of said at least one geometrical property before returning to rendering (b) and repeating subsequent (c)-(e) using the re-estimated value.

2. The method of claim 1, wherein said at least one geometrical property comprises at least one of light properties, surface color, reflectance properties, and scene geometry of said portion of said image.

3. The method of claim 1, wherein said at least one geometrical property is determined from a user input.

4. The method of claim 1, wherein said determining comprises inferring at least one of a light source position and object geometry based on a surface in said portion of said image.

5. The method of claim 4, wherein said inferring comprises employing an image formation theory.

6. The method of claim 1, wherein said at least one geometrical property is determined using at least one sensing device.

7. The method of claim 6, wherein said at least one sensing device is located in a capture environment of said image during image capture.

8. The method of claim 1, wherein a look of at least said portion of said image is modified using image formation theory, which includes determining a function to define a surface region of said portion of said image.

9. The method of claim 1, wherein a combination of light sources and geometry are determined using an illumination image and a specular image encoded with light and geometry information for a three dimensional environment.

10. The method of claim 1, wherein the match is determined based on at least one of objective criteria and image specifications.

11. The method of claim 1 further comprising refining the at least one geometric property using an illumination image and a specular image encoded with light and geometry information for a three dimensional environment.

12. A system for color correction of an image, comprising:
a reference display device configured to display images, wherein said images are captured in an indoor or outdoor environment; and
a processor configured to provide color correction such that said processor is enabled to:
select a portion of the image to be modified, wherein the selected portion includes a normal map that is continuous and smooth within the regions such that $$F(N(x)) = \int \left| L_r(x, \omega_r) - \rho_d(x) \sum_i (N(x) \cdot \omega_i(x)) L_i \right|^2 dx + \lambda \int |\nabla_x N(x)|^2 dx$$

and determine at least one geometrical property of the selected portion of the image to be modified by:
(a) estimating a value for said at least one geometrical property; said estimated value is computed by changing the light source or geometry of said selected portion;
(b) rendering said at least said portion of said image using said estimated value; and (c) comparing said rendered portion of said image to a corresponding portion of said original image to determine if a match exists therebetween; and
(d) modifying an appearance of at least the portion of said image by altering a value of the at least one determined geometrical property when a match exists; and
(e) when a match does not exist, re-estimating the value of the at least one of said at least one geometrical property before returning to the rendering (b) and repeating subsequent (c)-(e) using the re-estimated value.

13. The system of claim 12, comprising at least one sensing device for determining said geometrical properties.

14. The system of claim 12, comprising a user interface.

15. The system of claim 14, wherein said user interface comprises at least one of a wireless remote control, a pointing device, such as a mouse or a trackball, a voice recognition system, a touch screen, on screen menus, buttons, and knobs.

16. The system of claim 14, wherein said at least one geometrical property is communicated to said color correction device using said user interface.

17. The system of claim 12, wherein the match is determined based on at least one of objective criteria and image specifications.

* * * * *